United States Patent [19]

Mabuchi et al.

[11] Patent Number: 4,529,899

[45] Date of Patent: Jul. 16, 1985

[54] LEAF BRUSHES FOR SMALL ELECTRIC MOTOR

[75] Inventors: Takaichi Mabuchi, Matsudo; Toru Yano, Kashiwa, both of Japan

[73] Assignee: Mabuchi Motor Co., Ltd., Japan

[21] Appl. No.: 545,234

[22] Filed: Oct. 25, 1983

Related U.S. Application Data

[63] Continuation of Ser. No. 360,656, Mar. 22, 1982, abandoned.

[30] Foreign Application Priority Data

Apr. 1, 1981 [JP] Japan .................................. 56-48924

[51] Int. Cl.[3] .............................................. H02K 7/00

[52] U.S. Cl. ............................ 310/40 MM; 310/228; 310/248

[58] Field of Search ................ 310/40 MM, 219, 228, 310/238, 248, 251, 252

[56] References Cited

U.S. PATENT DOCUMENTS

| | | | |
|---|---|---|---|
| 599,781 | 3/1898 | Gutmann | 310/248 |
| 3,234,420 | 2/1966 | Lindner | 310/40 MM |
| 4,228,376 | 10/1980 | Mabuchi | 310/248 |

*Primary Examiner*—Peter S. Wong
*Assistant Examiner*—Anita M. Ault
*Attorney, Agent, or Firm*—McGlew and Tuttle

[57] ABSTRACT

Leaf brushes for small electric motors having commutator slide surfaces for making electrical contact with a motor commutator and constructed so that a multiplicity of fine ridges are densely formed on the commutator slide surfaces.

3 Claims, 11 Drawing Figures

LEAF BRUSHES FOR SMALL ELECTRIC MOTOR

This is a continuation of application Ser. No. 360,656 filed Mar. 22, 1982, now abandoned.

BACKGROUND OF THE INVENTION

This invention relates generally to leaf brushes for small electric motors, and more particularly to leaf brushes for small electric motors designed so as to reduce variations in motor revolution.

DESCRIPTION OF THE PRIOR ART

In recent years, an increasing number of small electric motors are being used in audio equipment, precision instruments and other various equipment. FIG. 1 schematically shows the rotary parts and brushgear of a typical small electric motor of this type. A rotor 1 with wire windings around the iron core thereof and a commutator 2 are fixedly fitted to a shaft 3. This assembly comprising the rotor 1, commutator 2 and shaft 3 is placed in a motor case (not shown) which houses a stator magnet. The rotor 1 and the commutator 2 are rotatably supported within the motor case, with an end of the shaft 3, which protrudes from the open end face of the motor case, being supported by a bearing provided on the motor case and the other end thereof being supported by a bearing provided on a motor case cover (not shown) for covering the open end portion of the motor case. Numeral 4 designates a leaf brush formed by blanking from a resilient and electrically conductive material and having formed therein a base portion 5, a brush portion 6 and a terminal portion 7 by bending at a bent portion 8, the base portion 5 being fixed to the motor case cover in such a manner that the terminal portion 7 is protruded from a hole provided on the motor case cover, and the brush portion 6 being caused to make contact with the commutator 2 by the resiliency thereof. Although not shown in the figure, another leaf brush having the same construction is of course provided opposite to the leaf brush 4 in the figure.

When used in audio equipment, such as a tape recorder, or precision instruments, this type of motor is required to have a stable operating performance with less variations in revolution. To satisfy this requirement, speed governing means using electronic circuits are often used. It is desired, however, that the motor itself should have as stable a rotating speed as possible, even without the use of such speed governing means. In this connection, the performance of the commutator and the brushes greatly affects variations in the rotating speed of a motor. To improve the performance of the commutator and the brushes, therefore, various means have so far been proposed, including polishing the brush slide surface of the commutator into a mirror-smooth surface by machining with a diamond cutter to improve the contact of the commutator with the brushes and reduce abrasion and contact resistance; or using a material having excellent conductivity and abrasion resistance for the commutator; or plating the surface of the commutator; or coating the commutator slide surface of the brushes with a tin or platinum film; or cladding the commutator slide surface of the brushes with a precious metal. None of them, however, has proved satisfactory due to various drawbacks, such as insufficient performance in preventing variations in rotation and high manufacturing costs.

Heretofore, efforts have been directed mainly toward improving the smoothness of contact surfaces since it has been generally believed that the contact surfaces of both the commutator and the brushes should be finished as smoothly as possible and a positive contact between the smoothly finished surfaces should be ensured to minimize contact friction between them. However, the inventor of this invention has discovered that this results only in heavy deposition of abrasion products and contaminants on the contact surfaces, which causes spark generation and poor conductivity, leading to variations in motor revolution.

The inventor of this invention took a new departure from the old practice of polishing the contact surfaces of the commutator and the brushes by finishing them into rather rough surfaces, instead of mirror-smooth ones, and succeeded in materially reducing variations in motor revolution compared with the conventional leaf brushes having smooth contact surfaces.

SUMMARY OF THE INVENTION

It is a main object of this invention to provide leaf brushes for small electric motors that are suitable for obtaining motors with less variations in rotating speed.

It is another object of this invention to provide leaf brushes for small electric motors wherein a multiplicity of fine ridges are densely formed on the commutator slide surfaces of the brushes.

DETAILED DESCRIPTION OF THE EMBODIMENT.

Figure 1:
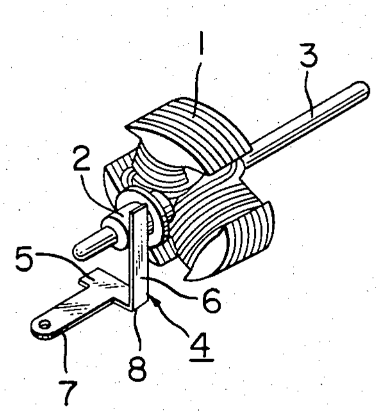
FIG. 1 is a perspective view of the rotary part and brush of a small electric motor.

In FIGS. 2 through 6, the same numerals as in FIG. 1 correspond with like parts throughout. Numeral 9 indicates a plated or cladded surface, and 10 indicates fine ridges.

Figure 2:
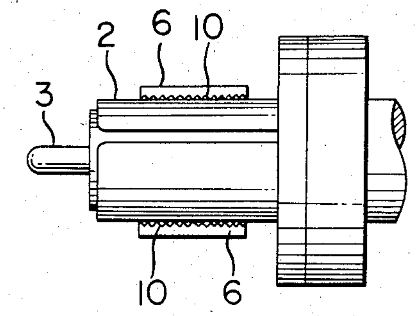
FIG. 2 is a schematic diagram illustrating the construction of a leaf brush embodying this invention.
Figure 3A:
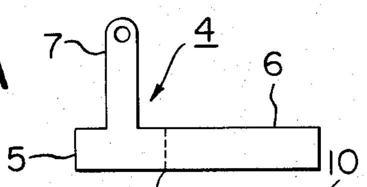
FIG. 3 (A) is a development of a conventional leaf brush, and FIGS. 3 (B) through (F) show essential parts of a leaf brush embodying this invention.
Figure 3B:
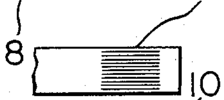
Figure 3C:
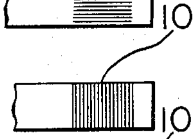
Figure 3D:
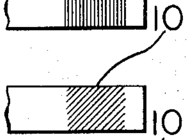
Figure 3E:
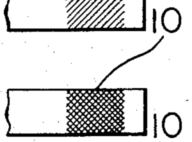
Figure 3F:
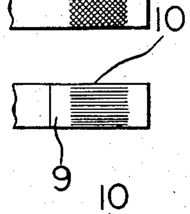

In this invention, a multiplicity of fine ridges 10 are densely formed or carved on the surface of the leaf brush 6 which makes sliding contact with the commutator 2, as shown in FIG. 2. It has been confirmed that this construction remarkably reduces variations in motor rotation.

The reason why the leaf brush of this invention having formed a multiplicity of fine ridges 10 on the commutator slide surface thereof can reduce variations in motor revolution has not necessarily been made clear as yet, but can be explained by the following reasoning.

As a large number of fine ridges densely formed on the commutator slide surface of the brushes make contact with the surface of the commutator, abrasion products, dirt and contaminants generated in between the commutator and the brushes are separated and accumulated in a large number of recesses densely formed on the commutator slide surface of the brushes. This may produce a self-cleaning effect of keeping the commutator surface and a large number of ridges on the brush surfaces clean. It is also considered that the contact of a large number of sharp ridges on the brush surfaces with the commutator surface produces an effect of cutting an oil or oxide film on the commutator surface, leading to good electrical contact between the brushes and the commutator.

FIG. 3 (A) is a development of a conventional leaf brush 4 before bending at the bent portion 8, which is shown to facilitate comparison with leaf brushes embodying this invention. FIGS. 3 (B) through (F) show embodiments of this invention where a multiplicity of fine ridges are densely formed on the commutator slide surface of the brush portion of a leaf brush.

The ridges 10 are provided in the longitudinal direction in FIG. 3 (B), in the transverse direction in FIG. 3 (C), in the oblique direction in FIG. 3 (D), and in the obliquely crisscrossing direction in FIG. 3 (E). In the embodiment shown in FIG. 3 (F), a multiplicity of fine ridges 10 are provided on the surface 9 which is formed on the commutator slide portion of the leaf brush by plating, cladding or other appropriate treatment. Needless to say, the ridges 10 may be formed not only in the longitudinal direction shown in the figure but also in similar directions to those shown in FIGS. 3 (B) through (E).

Figure 4:
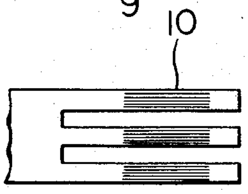
FIG. 4 shows another embodiment of this invention.

FIG. 4 shows another embodiment of this invention where the brush portion of a leaf brush is formed in a fork shape, and fine ridges 10 are densely provided on the commutator surface of the fork-shaped brush portion. Needless to say, the direction of the ridges 10 is not limited to the longitudinal direction shown in the figure.

In each embodiment mentioned above, a multiplicity of fine redges 10 may be formed by using an abrasive-coated paper or a lappling tape, or forming by means of a press or a roll, or other appropriate means, taking into account economy and other factors. In general, fine ridges are formed beforehand on a sheet blank prior to blanking into a brush shape as shown in FIG. 3 (A).

Figure 5:
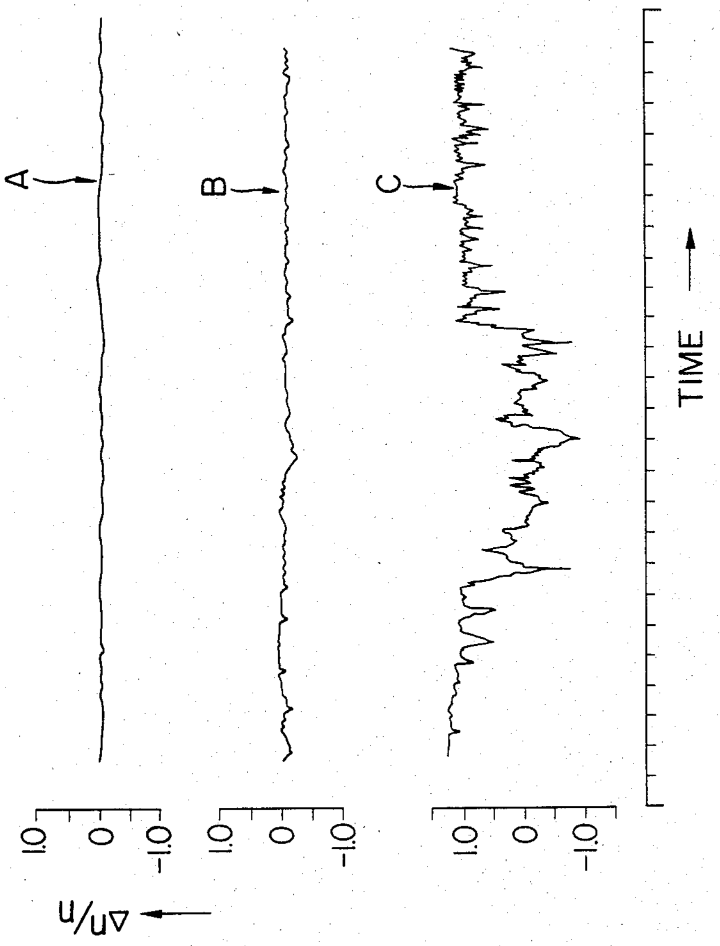
FIG. 5 is a diagram of assistance in explaining the effects of this invention.

FIG. 5 is a diagram of assistance in explaining the effects of this invention. The figure shows the results of tests where three small electric motors, which have different configurations . of the commutator slide surfaces of the leaf brushes but are essentially the same in other respects, were operated under no load at a rate of 2,400 rpm by applying a voltage of 6 V d.c. In the figure, the rates of variability in rotating speed of each motor are plotted with respect to time. The abscissa represents time (graduated in minutes), and the ordinate represents the rate of variability in rotating speed, $\Delta n/n$, expressed in percentage. Graph A in the figure is the test results for a motor having leaf brushes on the commutator slide surfaces of which a multiplicity of fine ridges of 12μ average height are densely formed in the longitudinal direction as shown in FIG. 3 (B). The graph indicates that the motor had a rate of variability in rotation of less than 0.1%, showing stable rotation. Graph B is the results for a motor having leaf brushes on the commutator slide surface of which fine ridges of 12μ average diameter are densely formed in the transverse direction as shown in FIG. 3 (C). This motor had a rate of variability in rotation of less than 0.3%, showing considerably stable rotation. Graph C is the results for a motor having conventional leaf brushes as shown in FIG. 3 (A) with smooth commutator slide surfaces. This motor had a rate of variability in rotation of max. 2.2%, and was subject to large variations in rotation. As is apparent from these graphs, the motors having leaf brushes of this invention (Graph A and B) were subject to far less variations in rotation, compared with those having conventional leaf brushes (Graph C).

The graphs also reveal that, even with leaf brushes embodying this invention, the brushes having fine ridges on the commutator slide surfaces in the longitudinal direction showed better results than those having fine ridges in the transverse direction.

Figure 6:
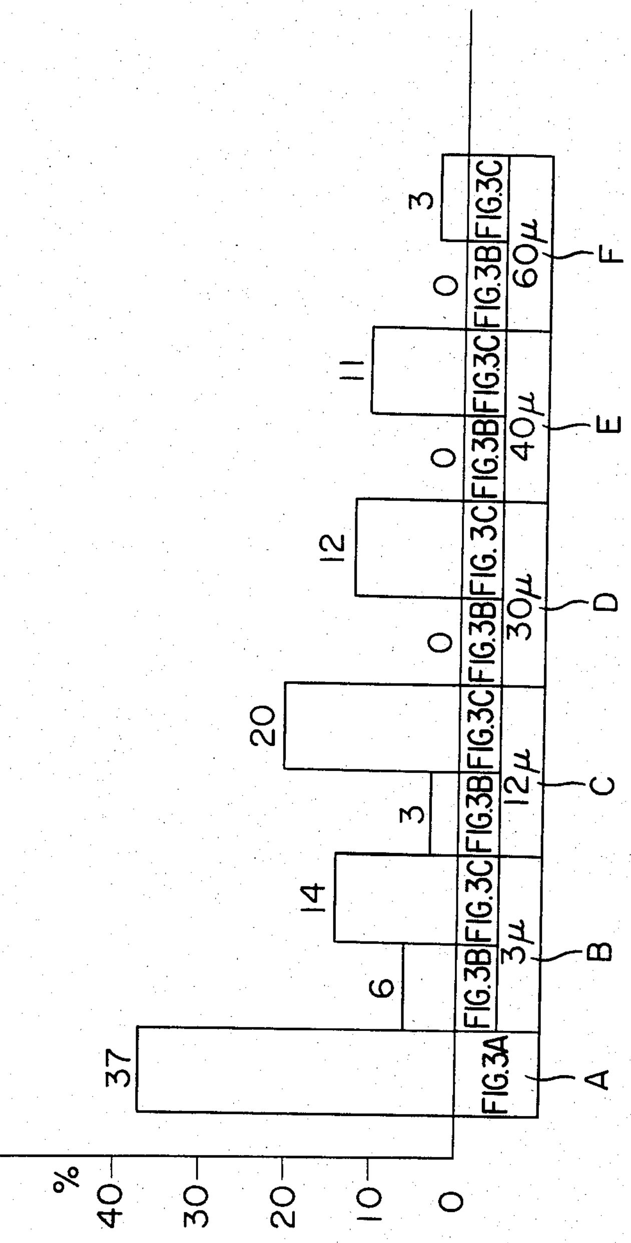
FIG. 6 is another diagram of assistance in explaining the effects of this invention.

FIG. 6 is another diagram of assistance in explaining the effects of this invention. The figure shows the results of tests where a certain number of motors having the same configuration of the leaf brush commutator slide surfaces were operated under the same operating conditions to obtain the frequency of occurrence of motors showing the rate of variability in rotation of more than 0.5%. The tests were conducted for several groups of motors with varied configuration of the leaf brush commutator slide surfaces (without changing other testing conditions). In the figure, the frequency of occurrence of motors showing the rate of variability in revolution of more than 0.5% under each testing condition are expressed in a histogram, with the abscissa representing different condigurations of the leaf brush commutator slide surfaces, and the ordinate representing the percentage frequency of occurrence of motors shown the rate of variability in revolution of more than 0 5% (hereinafter refereed to as the frequency of occurrence, for short). A in the figure designates the frequency of occurrence for motors having conventional leaf brushes with smooth commutator slide surfaces. B, C, D, E and F designate motors having on the leaf brush commutator slide surfaces thereof a multiplicity of fine ridges of 3μ, 12μ, 30μ, 40μ, and 60μ average heights, respectively. Furthermore, the values at left represent the frequency of occurrence for motors having on the leaf brush commutator slide surfaces thereof fine ridges in the longitudinal direction, as shown in FIG. 3 (B), and those at right represent the frequency of occurrence for motors having formed fine ridges in the transverse direction, as shown in FIG. 3 (C). As is evident from the figure, in the cases B through F where leaf brushes of this invention were used, the frequency of occurrence was much lower than in the case A where conventional smooth leaf brushes were used. This suggests that leaf brushes embodying this invention are more effective in reducing variations in motor revolution, compared with conventional leaf brushes having smooth commutator slide surfaces. The figure also indicates that, among the embodiments of this invention, brushes having formed fine ridges in the longitudinal direction show a greater effect in reducing variations in motor revolution than those having formed fine ridges in the transverse direction, and that the effect is increased with increases in the height of ridges.

As described above, this invention makes it possible to reduce variations in motor revolution by the use of a simple and inexpensive means of densely forming a multiplicity of fine ridges on the commutator slide surfaces of leaf brushes.

What is claimed is:

1. A leaf brush for a motor commutator of a small electric motor, consisting essentially of a one-piece brush member made of resilient electrically conductive sheet metal and having a flat leaf portion with a commutator slide surface on one side of said leaf portion which extends substantially tangentially to the motor commutator for making contact therewith, said slide surface having a multiplicity of densely arranged fine ridges formed thereon, said ridges formed of the same material and as one piece with said one-piece brush member and lying in only one direction and parallel to each other.

2. A leaf brush according to claim 1, wherein said fine ridges are defined only in a direction essentially parallel to the direction in which said one-piece brush member makes sliding contact with the commutator.

3. A leaf brush according to claim 1, wherein said fine ridges are formed only in a direction essentially intersecting a direction in which said brush member makes sliding contact with the commutator.

* * * * *